Dec. 12, 1967   S. L. SHILLER   3,357,910
ELECTRODE STRUCTURE INCLUDING TEMPERATURE CONTROL MEANS
Filed Dec. 8, 1964   2 Sheets-Sheet 1

INVENTOR.
STANLEY L. SHILLER
BY
Robert J. Schiller
ATTORNEY

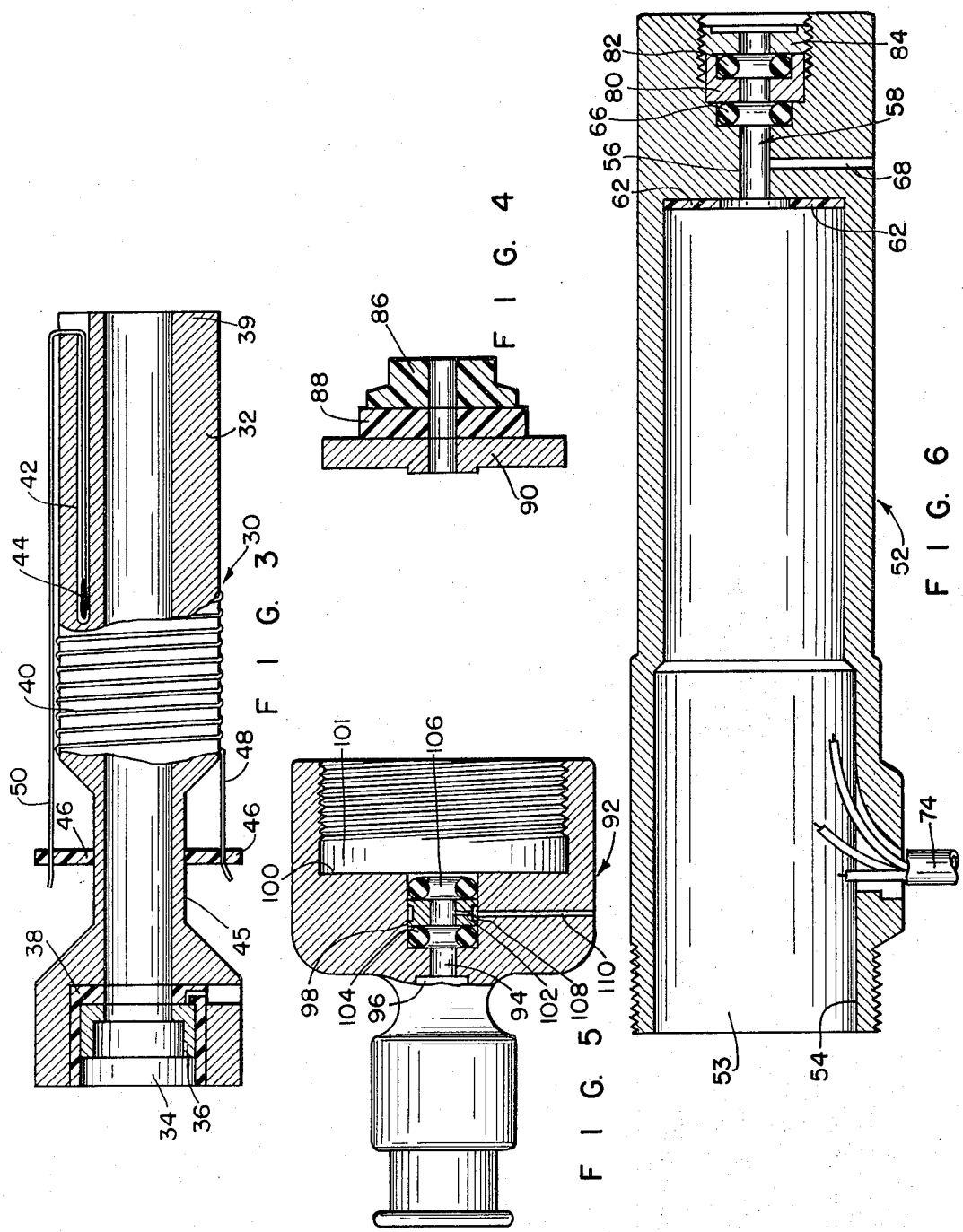

United States Patent Office 3,357,910
Patented Dec. 12, 1967

3,357,910
ELECTRODE STRUCTURE INCLUDING
TEMPERATURE CONTROL MEANS
Stanley L. Shiller, Needham, Mass., assignor to Corning Glass Works, Corning, N.Y., a corporation of New York
Filed Dec. 8, 1964, Ser. No. 416,746
12 Claims. (Cl. 204—195)

This invention relates to electrochemical measurements, and more particularly to the measurement of ionic concentrations in body fluids.

The measurement of one or more ionic parameters such as pH, $pCO_2$, pNa and the like, in body fluids such as blood is now considered a routine biochemical test of clinical importance. For example, the blood pNa is significant in shock; the blood $pCO_2$ level is a convenient measure for assessing the status of alveolar ventilation. This latter level can be determined directly, albeit with some difficulty, or indirectly by measuring the total plasma $CO_2$ content and the blood pH. From these two measurements, blood $pCO_2$ can be determined by the well known Henderson-Hasselbach equations. Alternatively, one can employ the Astrup technique described in his article in Scand. J. Clin. Lab. Invest., 8, 33 (1956) which requires a number of pH measurements.

Obviously, the accuracy of the measurement of the pH of blood depends upon many factors. For example, if the blood is exposed to atmospheric conditions for any length of time, its $CO_2$ content and thus the pH will change. Similarly, variations in the temperatures of such a blood sample will result in changes in the pH. Some typical pH electrodes may introduce a liquid-blood junction which adversely affects the blood pH.

The present invention, therefore, has as a principal object the provision of an electrode for accurately measuring ionic parameters of body fluids under conditions closely simulating actual body conditions for such fluids.

A further object of the present invention is to provide such an electrode for measuring such parameters in blood anaerobically and at a carefully regulated temperature.

Other objects of the present invention are to provide an electrode of the type described in which the ion-sensitive element is an ion-sensitive glass capillary which is readily replaceable, and to provide an electrode of the type described which uses neither liquid thermostating baths nor liquid reference electrolytes.

To achieve these and other objects, the electrode of the present invention generally comprises an elongated ion-sensitive glass capillary tube releasably mounted within container means, the exterior of the tube being coupled to an electrical lead by a solid electrolyte. The container means comprises a heating sleeve of electrically high-resistance material shaped to surround the greater portion of the tube and including means for sensing the temperature of the sleeve and for maintaining the temperature at a predetermined substantially constant value. Jacket means are provided for protecting the heating sleeve and tube, the jacket means being in the form of hollow, elongated member open at opposite ends. Means are included for closing one end of the jacket and for coupling one end of the tube preferably to an inert, substantially flexible capillary tube, and for closing the other end of the jacket and for connecting the other end of the tube to means for coupling the tube to a device for moving fluid through the tube. The entire electrode, when assembled is small, compact and substantially liquid-free. The fragile tube is thoroughly protected, thereby affording a rugged, portable instrument, and in the event of breakage, the electrode can be easily disassembled for replacement of the tube. Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 3 is another detail of the embodiment of FIG. 1 showing a heating sleeve;

FIG. 4 is another detail of the embodiment of FIG. 1 showing an insulating bushing for supporting certain elements of the structure;

FIG. 5 is another detail of the embodiment of FIG. 1 showing means for coupling the capillary tube to means for moving fluid through the latter; and FIG. 6 is yet another detail of the embodiment of FIG. 1 showing a protective jacket for supporting the elements of FIGS. 2 to 5 inclusive.

Figure 1:
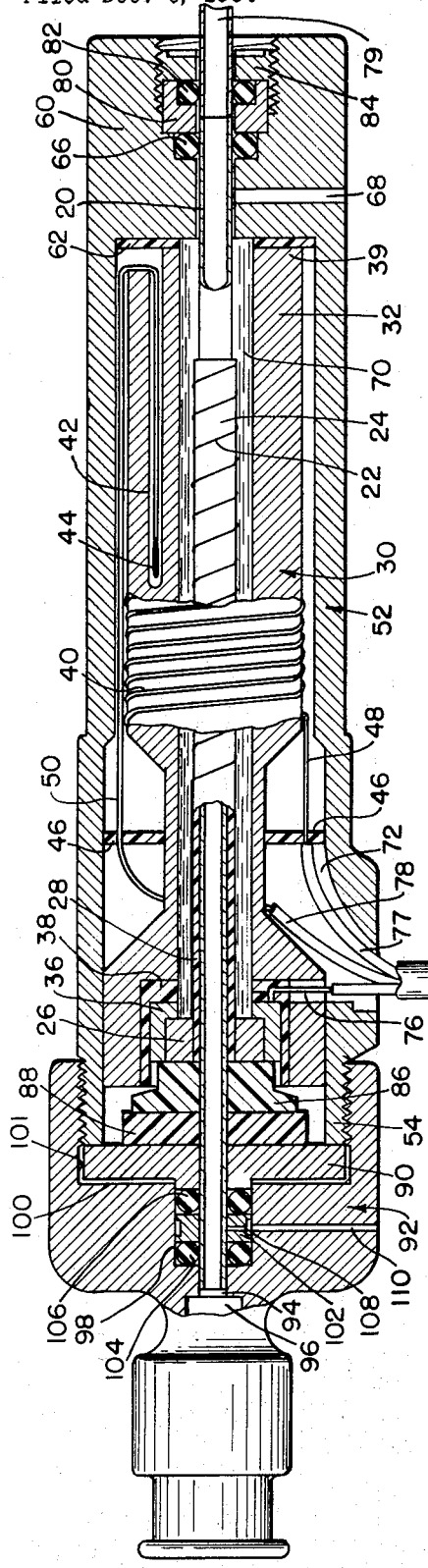
FIG. 1 is a cross-sectional view partly broken away and partly in fragment of an electrode structure embodying the principles of the present invention.

For clarity, the following description will be of an exemplary electrode particularly adapted for the determination of pH of blood, but it is to be understood that the invention thus disclosed is not to be considered limited to such usage. Referring now to the drawing, there will be seen particularly in FIGS. 1 and 2, an ion-sensitive element in the form of elongated, hollow capillary tube 20 formed for example of any of a number of well-known pH sensitive glasses. One end of an electrical lead or conductive wire 22 is positioned adjacent the exterior surface of an intermediate portion of tube 20 and both electrically and physically coupled to the latter by solid electrolyte 24. Electrolyte 24 preferably is a solid fused integral mass of an ionic crystalline material, such as a silver halide, in intimate physical and electrical contact with both the exterior surface of tube 20 and wire 22. To form the combination or assemblage of tube 20, wire 22 and electrolyte 24, typically one need only wrap a few turns of an end of wire 22 about tube 20 and fuse or melt the electrolyte in place as an integral mass between the wire and tube. Upon cooling, electrolyte 24 becomes substantially rigid and thus serves mechanically to hold wire 22 tenaciously to tube 20 and electrically to provide a link between wire 22 and tube 20 which allows of ionic charge transfer at the tube-electrolyte interface and electronic charge transfer at the electrolyte-wire interface.

The other end of wire 22 is connected to contact means such as metallic bushing 26, an electrically conductive, cylindrical member disposed about and electrically insulated from, as by insulation 28, another portion of the external periphery of tube 20. In order to avoid any spurious or drifting potentials due to leakage between bushing 26, and electrolyte 24 and inadvertent contact between wire 22 and tube 20, insulation 28 preferably also covers tube 20 between the locations of the bushing and the electrolyte.

Means, shown as sleeve 30 particularly in FIG. 3, are provided for heating and maintaining the ion-sensitive tube and any contents therein at a predetermined temperature. Sleeve 30 comprises an elongated hollow cylindrical member 32 formed of a high-heat-conductive material such as copper or the like and thus constitutes a heat sink. Member 32 is dimensioned such that at least the portion of tube 20 surrounded by electrolyte 24 can fit somewhat loosely therein. The interior of member 32 at one end thereof is provided with an enlarged section or bore 34 into which is fitted cylindrical electrical contact 36 spaced from bore 34 by appropriate electrical insulating material 38. Contact 36 is dimensioned and centrally perforated such that tube 20 can easily be inserted therethrough into member 32 but bushing 26 cannot and is engageable with contact 36. The interior of member 32 is also preferably lined with an insulator (not shown) such as a varnish to prevent accidental electrical contact, for example between wire 22 and member 32. Positioned adjacent and externally about the other end 39 of member 32 is heating means, such as a number of turns of high resistance wire 40, typically made of a nickel-chromium alloy, wound around member 32 and electrically insulated from but in intimate thermal contact with the latter. Member 32 is provided, between its exterior portion adjacent wire 40 and its hollow interior, with chamber 42 in which electrical heat sensing means, such as a known, thermally-responsive resistor element 44 is disposed.

Member 32, intermediate its ends includes a peripheral annular groove 45 in and around which is positioned upstanding, electrically insulating, perforated header 46. The latter is adapted to support electrical power leads 48 to and from heater wire 40, and electrical leads 50 to and from resistor elements 44, all of the leads being threaded into appropriate individual perforations in the header.

As means for protecting sleeve 30 and tube 20, there is provided, as shown particularly in FIG. 6, hollow, elongated cylindrical jacket 52 formed of a strong, preferably low-heat-conductive material such as an impact-resistant plastic, or the like. Both ends of jacket 52 are apertured, the opening 53 at end 54 being dimensioned such that the entire sleeve 30 can slide therethrough. Although the internal diameter of jacket 52 is substantially uniform throughout most of its length, at least a portion 56 of opening 58 in end 60 of the jacket is constricted such that it is only slightly greater in diameter than the external diameter of tube 20. The remainder 61 of opening 58 at end 60 is of larger diameter than portion 56. The external periphery of end 54 and the internal periphery of remainder 61 of opening 58 are threaded for attachment to coupling elements described hereinafter.

Figure 2:
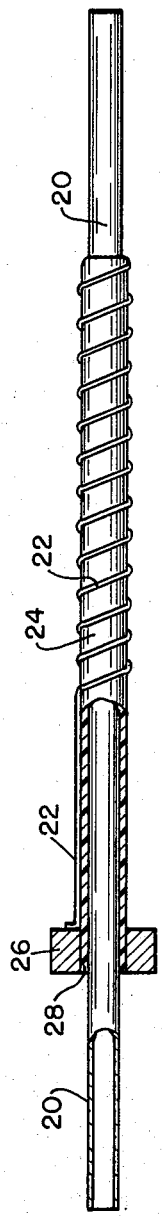
FIG. 2 is a detail of the embodiment of FIG. 1 showing an ion-sensitive capillary tube.

The portions of the invention thus described and shown in FIGS. 2, 3, and 6 are preferably assembled as follows: sleeve 30 is first positioned inside jacket 52 such that end 39 of member 32 is adjacent end 60 of the jacket. Tube 20 is then inserted into bore 34 of sleeve 30 until properly positioned such that electrolyte 24 is completely encased in the sleeve, and bushing 26 engages contact 36 as shown in FIG. 1, care being taken that the portion of tube 20 extending from end 39 to sleeve 30 is guided into portion 56 of opening 58. Tube 20 is sufficiently longer than sleeve 30 as to extend somewhat out of both ends of the latter when so positioned.

The assembly includes a resilient seal, such as rubber washer 62, positioned between end 39 of sleeve 30 and shoulder 64 provided by the constriction of the interior of jacket 52 at opening 58. When in assembled relation, both end 39 and shoulder 64 are in engagement with washer 62 and tube 20 extends through portion 56 of opening 58 and ends inside remainder 61. Means, such as O-ring 66, are provided at the junction of portion 56 and remainder 61 of opening 58 for supporting and sealing tube 20 therein. Contact 36 and bushing 26 are so shaped and dimensioned that when in engagement, they fit snugly together, thus constituting a support adjacent the other end of tube 20 which extends therethrough. When thus supported adjacent both ends, tube 20 is suspended within and spaced from the interior wall of sleeve 30. In order to provide enhanced heat transfer between the sleeve and tube, jacket 52 includes first small lateral passage 68 between its exterior and portion 56 of opening 58, into which passage liquid or plastic heat transfer medium 70, such as silicone grease loaded with high-heat-conductive metal oxides, is injected until substantially all of the space between tube 20 and sleeve 30 is filled. It will be apparent that the seals provided respectively by O-ring 66, bushing 26, and washer 62 prevent leakage of medium 70 into remainder 61 of opening 58, into opening 34, and between the sleeve and the jacket.

Jacket 52 includes, adjacent end 54, a second opening or passageway 72 between its exterior and the interior near the assembled position of header 46. A shielded, composite electrical cable 74 is included which has appropriate leads or extensions connected at the header to leads 48 and 50, and also separately shielded leads 76 connecting to contact 36 for coupling the ion-sensitive assemblage to an external measuring device such as the usual electrometer. The shielding, such as metallic braid 77, about cable 74 is also connected as at 78 to member 32 in order to ground the latter so that it can also function as an electrostatic shield.

As shown particularly in FIG. 6, means are included for coupling, in opening 58, the end of tube 20 to a substantially chemically and electrical inert capillary 79 of like diameters. Capillary 79 typically is formed of a flexible plastic material, such as polyethylene or the like, so that it may function as a probe or nozzle if desired. In order to seal the junction between tube 20 and capillary 79, there is included gasket 80, made for example of metal, apertured to fit snugly around the junction and within remainder 61 of opening 58. Gasket 80 also includes an annular slot in which deformable O-ring 82 is disposed so as to provide an additional seal about capillary 79. Means, such as plug 84 having a central aperture through which capillary 79 extends, and also having a peripheral thread intended to mate with the threading of opening 58, is provided for retaining O-rings 82 and 66 and gasket 80 in place. Plug 84 can be advanced along the threads to provide pressure to deform the O-rings sufficiently to insure a thoroughly and releasably locked seal of tube 20 to both jacket 52 and to capillary 79.

To assure that, when assembled, bushing 26 makes a positive, releasably locked electrical connection with contact 36, and also to firmly hold attached tube 20 in assembled position, there is provided a substantially electrically insulating, rigid spacer 86 shown particularly in FIG. 4. Spacer 86 is centrally apertured to fit around tube 20 and shaped to contact bushing 28, being formed, for example, of a substantially rigid synthetic polymer such as a polycarbonate material. Disposed coaxilly adjacent spacer 86 is resilient means such as rubber washer 88, for exerting an axial force on spacer 86 when under compression. Compression washer 90, for example of stainless steel, is disposed coaxially next adjacent washed 88.

As shown in FIG. 5, means are included for coupling tube 20 to apparatus or a pump for moving fluid through the tube. To this end, there is provided tubular cap 92 having a substantially central passage 94 of slightly greater internal diameter than the external diameter of tube 20. One end of passage 94 opens to form an enlarged passage 96 shaped to accept a pumping device such as a standard hypodermic syringe, passage 96 being akin to the passage in the hub of a hypodermic needle. The other end of passage 94 also opens into an enlarged coaxial volume 98 and the latter in turn opens at a sharp shoulder or face 100, into another enlarged coaxial cylindrical passage 101. The latter is internally threaded and has an internal diameter sufficient to fit about the external diameter of, and in meshed relation with end 54 of sleeve 52. Disposed within coaxial volume 98 is cylindrical gasket 102, preferably formed of a substantially rigid material such as a metal, and being centrally apertured to fit closely about tube 20. The gasket has, intermediate its ends, an annular, peripheral groove. A radial relief channel 108 is provided in gasket 102 between the peripheral groove and the central aperture. Gasket 102 is positioned within volume 98 between a pair of deformable O-rings 104 and 106. Volume 98 is provided with vent 110 running from a point adjacent the position of the groove in gasket 102 to the exterior surface of cap 92.

Cap 92 is threaded onto sleeve 52 such that when the latter contains the other assemblage of elements theretofore described, rotation of the cap advances shoulder 100 into engagement with compression washer 90. This serves to compress both washer 88 and O-rings 104 and 106. This provides a double seal in volume 98 about tube 20 and also provides a force holding bushing 26 firmly against contact 36.

In operation, a sample of fluid such as blood can be stored in a pump body or syringe adapted to be connected to passage 96 and the sample then pumped through the passage 96 into tube 20. Alternatively, the blood can be aspirated by such a pump through capillary 79 and into tube 20. In some respects this latter method is preferred inasmuch as it tends to minimize possible temperature variations between the time the blood sample is released from the circulatory system of a subject and the time its pH is measured by the invention. For example, the blood sample is obtained by puncturing the subject and aspirating the sample from the resulting pool into which capillary 79 is dipped. As the syringe or pump applies suction, the blood sample is drawn into tube 20 until the latter is filled. Because tube 20 typically is 0.5 mm. in internal diameter and 10 cm. long the volume of the sample needed can be quite small. Immediately after the requisite sample is obtained, capillary 79 is dipped into an electrolyte solution, such as aqueous saturated KCl, and sufficient of the sample expressed from capillary 79 as necessary to avoid air bubble formations which might prevent the formation of an electrolyte-blood liquid to liquid junction. Some electrolyte may be drawn into capillary 79 for some distance, but it is preferred that care be taken that substantially only the blood sample be allowed to enter tube 20. The use of transparent or translucent plastic for capillary 79 is preferred in order to provide a view of the location of the liquid to liquid junction thus formed, and thus permit maintenance of the junction at or near the distal end of the capillary 79.

Electrical current from a controllable source (not shown) is applied to wire 40 for heating the latter and associated member 32. The temperature of the latter is sensed by element 44 to provide, through known control circuits, feedback signals for controlling the magnitude of current from the controllable source. Where the fluid sample in tube 20 is human blood, for example, the current is preferably controlled to keep tube 20 at human body temperature. Of course, because the sample is substantially confined within tube 20, it is also maintained in an anaerobic condition during measurement.

The pH of the sample is obtained according to the sensitivity of the glass of which tube 20 is typically formed, the potential across the glass from inside to outside surface being a function of the pH. Such potential and variations thereof, are transmitted to a known electrometric device (not shown) through wire 22 which is electrically and mechanically coupled to tube 20 by electrolyte 24.

If fluid is to be injected into tube 20 from a syringe emplaced in passage 96, it is important that leakage at the tube 20-to-cap-92 seal be minimized. It will be apparent thus that if O-ring 104 should fail and leakage occur, the structure allows the leakage fluid to be vented through relief channel 108 and vent 110. This provides a visual and possible tactile warning of leakage, as well as insuring that the pressure against second O-ring 106 is considerably reduced.

If for example, it is desired for cleaning purposes or because of breakage to replace the assemblage of tube 20, electrolyte 24 and wire 22, one need only unscrew cap 92 and plug 84 respectively from openings 53 and 61, and disassemble the electrode.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. An electrode structure for measuring ionic concentrations in fluid, said structure comprising, in combination:
   an elongated hollow tube of ion-sensitive material;
   an electrically conductive lead spaced from the outer surface of said tube;
   a solid fused integral mass of an ionic crystalline material in intimate physical and electrical contact with both said surface and said lead;
   a solid heat-conductive and electrically-conductive sleeve encasing at least a portion of said tube, lead and crystalline material;
   electrical means for heating said sleeve; and
   means for sensing the temperature of said sleeve for providing feedback signals adapted to control the heating of said sleeve.

2. An electrode as defined in claim 1 including means for coupling an end of said tube to means for pumping said fluid into said tube.

3. An electrode as defined in claim 2 including means for releasably supporting said tube, lead and crystalline material in spaced relation from and within said sleeve, and
   a heat-transfer medium disposed in the space between said sleeve and said tube, lead and crystalline material.

4. An electrode as defined in claim 3 including a protective jacket of substantially solid material disposed about said sleeve.

5. An electrode as defined in claim 1 including means for electrically insulating said sleeve from said tube, and means for coupling said sleeve to a system ground.

6. An electrode structure for measuring ionic concentrations in fluid, said structure comprising in combination:
   an elongated tubular jacket having a passageway therein open at opposite ends:
   an elongated ion-sensitive assemblage disposed substantially within and spaced from the interior surface of said passageway, said assemblage including an elongated hollow tube of ion-sensitive material; and
   a solid fused integral mass of an ionic crystalline material in intimate physical and electrical contact with and between both said surface and said lead;
   means disposed adjacent each end of said passageway for releasably supporting and for sealing a corresponding end of the exterior surface of said assemblage to the interior surface of said passageway;
   an electrically resistive element disposed in the space between said interior surface of said passageway and said assemblage for heating said tube;
   electrical means for sensing the heat provided by said element, and
   electrical lead means connected respectively to said electrically conductive lead, said electrically resistive element and said sensing means for coupling respectively said lead to potential measuring means, said element to a source of heating current, and said sensing means to means for controlling the current from said source.

7. An electrode structure as defined in claim 6 including an electrically conductive solid heat sink disposed between said resistive element and said assemblage:
   means for electrically insulating said sink from said assemblage; and
   means for shielding said electrical lead means and being electrically connected to said sink.

8. An electrode structure as defined in claim 7 including a heat transfer medium disposed between and in contact with said sink and said assemblage.

9. An electrode structure as defined in claim 7 wherein said tube is formed of a pH sensitive glass and said ionic material is a silver halide.

10. An electrode structure as defined in claim 7 including means for coupling one end of said tube to pump means.

11. An electrode structure as defined in claim 10 wherein said means for coupling includes a pair of seals disposed about said tube adjacent said one end and spaced from one another by gasket means having a vent passage therein disposed between said seals and extending substantially radially from the axis of said tube such that the pressure of fluid leakage due to failure of that seal closest to said pump means is relieved through said vent passage.

12. An electrode structure as defined in claim 10 including a second tube of material substantially insensitive to said ionic concentrations, and means for communicatively coupling said second tube to said tube of ion-sensitive material at the other end of the latter.

References Cited
UNITED STATES PATENTS

| | | | |
|---|---|---|---|
| 2,201,659 | 5/1940 | Young | 204—195.1 |
| 2,755,243 | 7/1956 | Beckman et al. | 204—195.1 |
| 3,224,436 | 12/1965 | Le Massena | 128—2.1 |
| 3,282,817 | 11/1966 | Riseman et al. | 204—195.1 |

ROBERT K. MIHALEK, *Primary Examiner.*

JOHN H. MACK, *Examiner.*